United States Patent [19]

Norton

[11] Patent Number: 4,607,441

[45] Date of Patent: Aug. 26, 1986

[54] STONE DIGGING ATTACHMENT FOR FRONT END LOADER ATTACHMENT OF A TRACTOR

[76] Inventor: R. Scott Norton, Box 23, Rocanville, Saskatchewan, Canada, S0A 3L0

[21] Appl. No.: 729,033

[22] Filed: Apr. 30, 1985

[51] Int. Cl.⁴ ............................................. A01B 43/00
[52] U.S. Cl. .................... 37/2 R; 172/247; 172/253; 172/697; 172/766
[58] Field of Search ............... 37/2 R; 171/43, 105, 171/107; 172/247, 251, 253, 691, 694, 697, 699, 763, 766, 810

[56] References Cited

U.S. PATENT DOCUMENTS 3,274,710  9/1966  Wright ................................. 37/2 R

FOREIGN PATENT DOCUMENTS 151678  6/1953  Australia ............................... 37/2 R
164169  7/1955  Australia ............................... 37/2 R
1940446  5/1971  Fed. Rep. of Germany ....... 37/2 R Primary Examiner—Richard T. Stouffer
Attorney, Agent, or Firm—Stanley G. Ade

[57] ABSTRACT

A stone digging implement is manufactured as a simple and inexpensive attachment for the front end loader of a tractor. The attachment comprises a frame formed by a pair of horizontal I-beams which support a pair of hooked or pointed tines which extend downwardly from the I-beams for engaging the ground.

18 Claims, 5 Drawing Figures

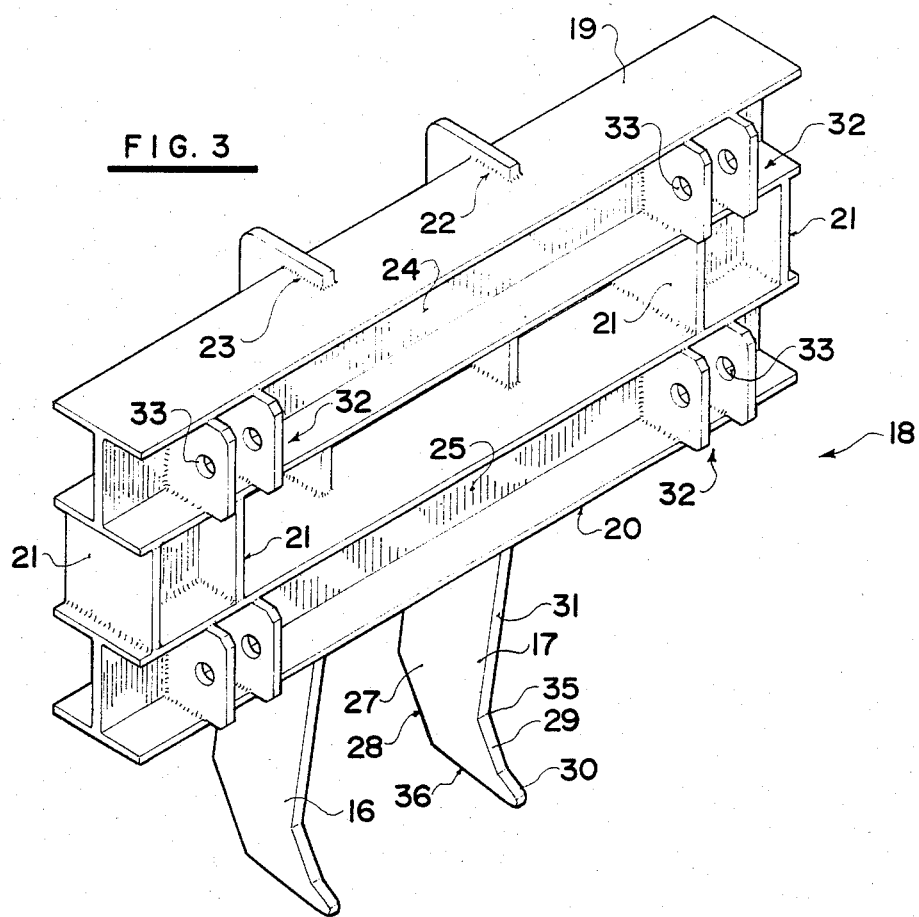

STONE DIGGING ATTACHMENT FOR FRONT END LOADER ATTACHMENT OF A TRACTOR

BACKGROUND OF THE INVENTION

This invention relates to a stone digger particularly of the form which can be supplied as an attachment to a conventional tractor.

In farming, stones and rocks can be a serious problem and much attention has been given in recent years to the development of rock pickers for collecting surface rocks and rocks which are close to the surface so that they do not interfere with later passage of seeding, cultivating and harvesting equipment. However, rock pickers are limited in relation to the size of rock that can be removed which leaves numbers of very large rocks, up to say three feet in diameter, which cannot be removed by the rock picker and yet provide a substantial obstacle to the later passage of other equipment.

Specialized stone digging equipment is available for removing such large stones. However, this tends to be expensive and thus has a limited market potential. The conventional back-hoe can also be used for removing stones of this type, but again the equipment is expensive and also of limited capabilities.

SUMMARY OF THE INVENTION

It is one object of the present invention, therefore, to provide a stone digging attachment which can be used with the conventional tractor, the attachment being of simple and inexpensive construction.

According to a first aspect of the invention, therefore, there is provided a stone digging attachment for the front end loader mechanism of a tractor of the type comprising, with the bucket removed, a pair of horizontally spaced lift arms and a pair of horizontally spaced hydraulic cylinders mounted above the lift arms, the attachment comprising a frame having a first pair of brackets for attachment to said lift arms and a second pair of brackets for attachment to said cylinders, and a pair of parallel spaced downwardly extending stone engaging tines mounted on said frame whereby the tines can be engaged into the ground against the stone by operation of said lift arms and cylinders for withdrawl of the stone from the ground.

According to a second aspect of the invention, therefore, there is provided a tractor having a front end loader mechanism of the type comprising, with the bucket removed, a pair of horizontally spaced lift arms and a pair of horizontally spaced hydraulic cylinders mounted above the lift arms, and a stone digging attachment mounted on said lift arms and said hydraulic cylinders and including means for engaging into the ground and contacting a stone for removing the stone.

It is a major advantage of the invention, therefore, that it can comprise merely a pair of cross members at right angles to the tines each carrying two pairs of flanges which enable the cross members to be coupled respectively to the lift arms and hydraulic cylinders of the front end loader mechanism of the tractor.

The tines can be formed from a pair of parallel spaced flat plates which are inclined downwardly and away from the brackets with a pointed end at the lower end inclined downwardly and forwardly relative to the brackets and the tractor so that the pointed end can be engaged onto the ground and pressed into the ground by operation of the hydraulic cylinders to wrap around the rock or stone which is partly under the ground.

The shape of the tines then allows the rock to be rolled out of the ground by reversing the tractor so that the full power of the tractor is available to roll the rock out of the ground. The edges of the plates at the point are preferably hardened to allow the tines to properly engage into the ground and around the rock without damage.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention in which:

DESCRIPTION OF THE DRAWINGS

FIG. 3 is an isometric view from the front and one side of the attachment of FIGS. 1 and 2.

In the drawings like characters of reference indicate corresponding parts in the different figures.

DETAILED DESCRIPTION

Figure 4:
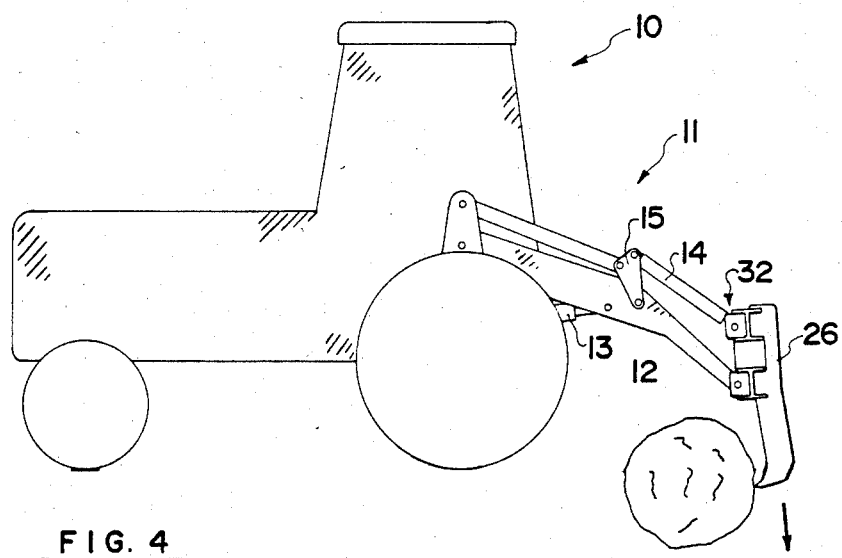
FIG. 4 is a side elevational view of the attachment mounted on a tractor shown in schematic working arrangement.

A tractor is shown schematically in FIG. 4 at 10 including a conventional front end loader generally indicated at 11 which is standard equipment on most farms. As conventional, the front end loader comprises a pair of lift arms 12 which are pivotally attached to the tractor and can be raised and lowered by a pair of hydraulic cylinders 13 operated from the tractor hydraulics.

In addition, tilt cylinders 14 are attached by a pivotal mounting bracket 15 to the lift arms 12. In conventional arrangement, a bucket is mounted on the pivot coupling at the front end of the lift arms 12 and the front end of the piston rods of the cylinders 14 so that they can be raised and lowered by the arms 12 and tilted by the cylinders 14. This is conventional equipment and does not need to be described in detail herein. It will, however, be appreciated that various designs of front end loader are available in different manufactures of tractors but the differences generally relate to differences in spacing and positioning of the arms and cylinders 12, 14.

Figure 2:
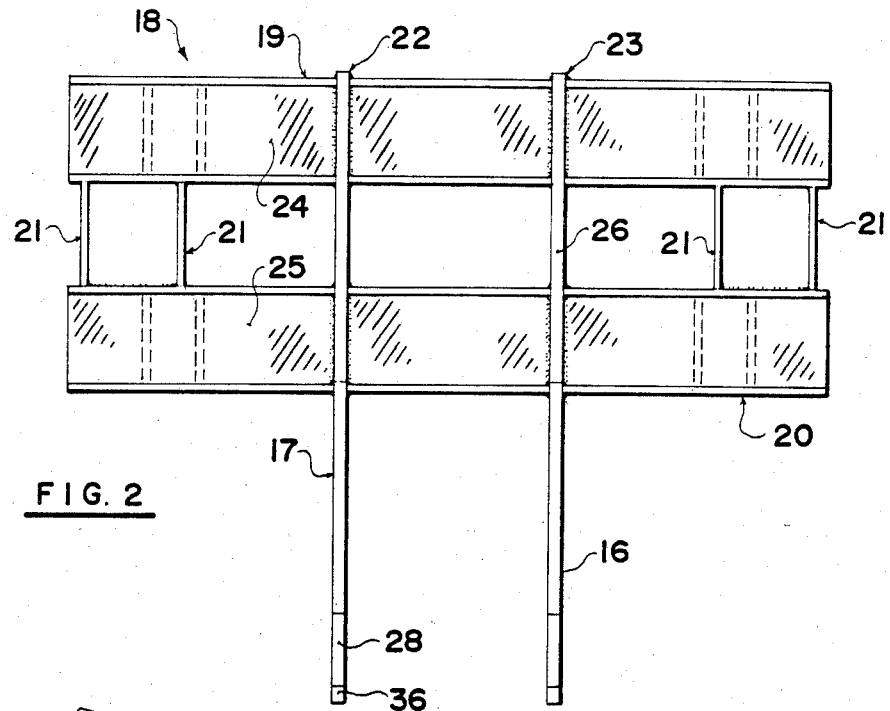
FIG. 2 is a rear elevational view of the attachment of FIG. 1.
Figure 1:
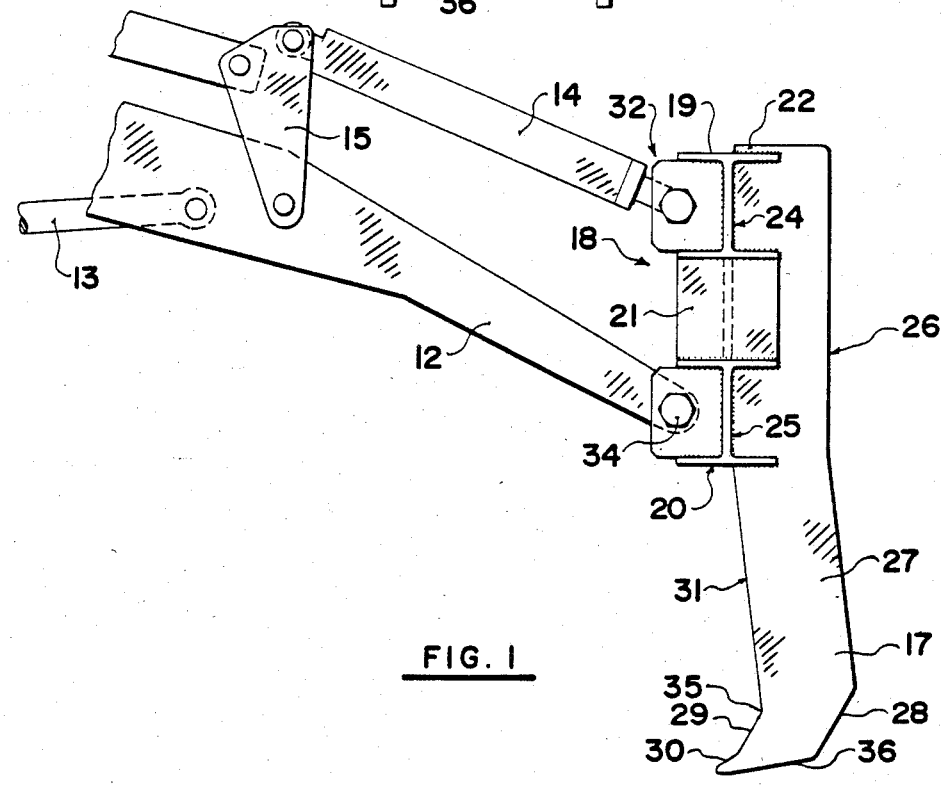
FIG. 1 is a side elevational view of the stone digging attachment according to the invention, attached to the front end loader arrangement of a tractor, only part of which is shown.

Turning now to FIGS. 1, 2 and 3, the attachment comprises basically a pair of downwardly depending tines or blades 16, 17 which are formed from flat mild steel plate, preferably of one-inch thickness. The tines or blades 16, 17 are arranged in spaced and parallel relationship and are mounted upon a frame generally indicated at 18 which attaches the tines to the front end loader arrangement of the tractor.

The frame comprises a pair of I-beams 19 and 20 which are arranged in parallel spaced relation at right angles to the tines 16, 17. The I-beams are of a material which provides an 8-inch wide flange at 24 lbs. per foot of material and are interconnected by two pieces of the same material indicated at 21 which are welded to the top flange of the bottom I-beam 20 and the bottom flange of the top I-beam 19 with the flanges thereof at right angles thereto so as to interconnect the beams into a solid rectangular frame.

The tines or blades 16, 17 are attached to the frame by insertion into slots cut in the rear half of the flanges of the I-beams. Two of these slots are indicated in the top flange at 22, 23 respectively in FIG. 3. The corresponding slots in the bottom flange of the I-beam 19 and in the top and bottom flanges of the I-beam 20. These slots are generally visible in FIG. 2 and it will be noted that the blades 16, 17 are welded to the I-beams both at the slots and along the webs of the I-beams indicated at 24, 25 respectively.

The width of the blades 16, 17 is such that they extend beyond the end of the flanges of the I-beams to a position rearwardly of the frame 18. This section of the blade lies parallel to the frame, that is the rear wall 26 of the blade lies parallel to the webs 24, 25 of the frame.

Beyond the bottom of the frame, as defined by the bottom flange of the bottom I beam 20, the blades each include a rearwardly inclined portion 27, the front and rear walls of which are inclined to the wall 26 by an angle of the order of 10°. At a lowermost end of the portion 27, the front and rear walls are inclined forwardly as indicated at 28, 29 so as to form a forwardly projecting tooth 30 directly at the bottom of the blade 16, 17. The tooth 30 thus forms a projection which can be readily inserted into the ground.

In addition, the front wall indicated at 31 of the portion 27, together with the front wall 29 of the tooth portion provide a concave or cup shape for wrapping around the generally convex outer surface of a stone to be removed.

The edge surface of the blade at the tooth 30 and on either edge of the tooth running back for approximately three inches, is hardened by any conventional technique, generally by hard surfacing to increase the wearability of the mild steel from which the blades are cut.

With the opposite side of the I-beams 19 and 20 from the blades at 16 and 17, are provided a plurality of brackets generally indicated at 32. Each bracket is formed from a pair of parallel spaced flanges welded into the channel formed by the flanges and web of the respective I-beam. The flanges have aligned holes for receiving a cross pin or cross bolt by which a similar opening in the lift arms and tilt cylinders can be attached. The holes are indicated at 33 in FIG. 3 and bolts 34 shown in FIG. 1 pass through the holes to attach the lift arm 12 and cylinder 14 to the bottom and top I-beams respectively.

Although, as shown, the brackets 32 are of the same dimensions, that is they project slightly out of the channel formed by the I-beams 19, 20 thus providing the hole 33 at or adjacent the edge of the I-beam, they can be of different sizes to accommodate different relative positions of lift arm and tilt cylinder of different manufactured arrangements. Thus, the flanges providing the brackets 32 can be welded into place as the last item of the frame and tines with the spacing between the brackets and the position of the holes 33 relative to the I-beams being tailored to fit particular front loader arrangements.

Turning specifically to the side view of FIG. 1, it will be noted that the point 30 lies in line with the upper front edge of the respective tine with the recess defined by the rearwardly and forwardly inclined walls 31, 29 respectively being of the order of three inches. That is, the apex indicated at 35 is spaced three inches behind the line including the webs 24, 25 and the point 30.

In addition, the lowermost surface indicated at 36 which is inclined forwardly and downwardly to the point 30 is of the order of one and one-quarter inches higher at its rear end than at its front end at the point 30. The walls 28 and 29 are both of the order of six inches in length.

The width of the tines is of the order of nine inches and the spacing between them of the order of eighteen inches. The height of the frame is twenty-four inches and the width of the frame of the order of five feet. This allows the attachment to accommodate most types of front end loader arrangement merely by tailoring the mounting brackets 32 to the particular requirement.

Figure 5:
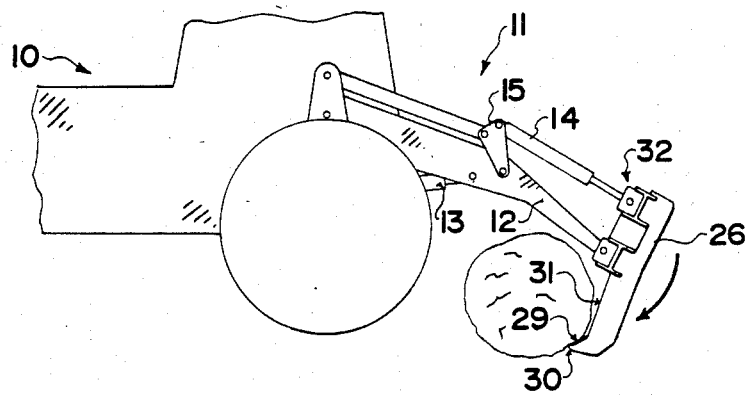
FIG. 5 is a view similar to that of FIG. 4 showing the movement by which a stone is removed from the ground.

Turning now to FIGS. 4 and 5, it will be noted that the mounting brackets 32 are arranged such that with the lift arms 12 in the lowered position, the lower portion 27 of the tine is inclined rearwardly and downwardly away from the tractor at an angle of the order of 45° so the point 30 projects effectively straight downwardly. In this position, the tilt cylinders 14 are operated to pivot the tines about the lower end of the lift arms so the point 30 is projected into the ground to engage a stone which can be as large as 3 to 4 feet in diameter at a position below its centre line. The point thus tends to engage the stone with the curvature of the stone sitting between the surfaces 31 and 29.

At this time the tractor is placed into reverse and moved away from the stone so that the stone is effectively rolled out of its hole onto the surface of the ground by the surfaces 29, 31 and also by the point 30 which particularly engages the stone and acts to roll it.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A stone digging attachment for the front and loader mechanism of a tractor of the type comprising, with the bucket removed, a pair of horizontally spaced lift arms and a pair of horizontally spaced hydraulic cylinders mounted above the lift arms, the attachment comprising a frame having a first pair of brackets for attachment to said lift arms and a second pair of brackets for attachment to said cylinders, and a pair of parallel spaced downwardly extending stone engaging tines mounted on said frame whereby the tines can be engaged into the ground against the stone by operation of said lift arms and cylinders for withdrawal of the stone from the ground, each tine having a pointed tooth at the bottom end thereof arranged at an angle to the length of the tine and directed such that, when the attachment is mounted on the tractor, the tooth is pointed toward the tractor, said frame comprising a pair of parallel spaced I-beams with the tines welded to each at right angles thereto such that each tine passes through and is welded to slots formed in half of the top and bottom flanges of the I to one side of the web of the I.

2. The invention according to claim 1 wherein the tines are arranged relative to the frame and to the brackets such that, when the attachment is mounted on the tractor and when the lift arms are lowered to place the tines against the ground, the length of the tines is inclined relative to a vertical axis in a direction away from the tractor with the point thereof directed forwardly and downwardly into the ground.

3. The invention according to claim 1 wherein, when the frame is attached to the tractor and arranged in a vertical plane, each tine includes a portion thereof extending downwardly and away from the tractor with the tooth thereof extending from the lowermost end of said portion downwardly and toward said tractor.

4. The invention according to claim 1 wherein each tine and associated tooth is formed from a flat plate with the plane of the plate parallel to and spaced from the plane of the plate of the other tine.

5. The invention according to claim 1 wherein each tooth has edges leading away from the point thereof which are hardened.

6. The invention according to claim 1 wherein each tine and associated tooth is formed from a flat plate wherein the edges of the plate leading away from the point of the tooth are hardened.

7. The invention according to claim 1 wherein each bracket defines a pair of spaced parallel flanges with a hole passing through each flange transversely thereto for receiving a coupling pin passing through both flanges.

8. The invention according to claim 1 wherein the brackets are spaced by a wider distance than the tines.

9. The invention according to claim 1 wherein the spacing of the tines is of the order of eighteen inches.

10. A stone digging attachment for the front end loader mechanism of a tractor of the type comprising, with the bucket removed, a pair of horizontally spaced lift arms and a pair of horizontally spaced hydraulic cylinders mounted above the lift arms, the attachment comprising a frame having a first pair of brackets for attachment to said lift arms and a second pair of brackets for attachment to said cylinders, and a pair of parallel spaced downwardly extending stone engaging tines mounted on said frame whereby the tines can be engaged into the ground against the stone by operation of said lift arms and cylinders for withdrawal of the stone from the ground, each tine having a pointed tooth at the bottom end thereof arranged at an angle to the length of the tine and directed such that, when the attachment is mounted on the tractor, the tooth is pointed towards the tractor, the frame comprising a pair of parallel spaced I-beams arranged at right angles to the tines, the brackets each being formed by a pair of flanges welded against the cross members and web of the I at right angles thereto.

11. The invention according to claim 10 wherein the tines are arranged relative to the frame and to the brackets such that, when the attachment is mounted on the tractor and when the lift arms are lowered to place the tines against the ground, the length of the tines is inclined relative to a vertical axis in a direction away from the tractor with the point thereof directed forwardly and downwardly into the ground.

12. The invention according to claim 10 wherein, when the frame is attached to the tractor and arranged in a vertical plane, each tine includes a portion thereof extending downwardly and away from the tractor with the tooth thereof extending from the lowermost end of said portion downwardly and toward said tractor.

13. The invention according to claim 10 wherein each tine and associated tooth is formed from a flat plate with the plane of the plate parallel to and spaced from the plane of the plate of the other tine.

14. The invention according to claim 10 wherein each tooth has edges leading away from the point thereof which are hardened.

15. The invention according to claim 10 wherein each tine and associated tooth is formed from a flat plate wherein the edges of the plate leading away from the point of the tooth are hardened.

16. The invention according to claim 10 wherein each bracket defines a pair of spaced parallel flanges with a hole passing through each flange transversely thereto for receiving a coupling pin passing through both flanges.

17. The invention according to claim 10 wherein the brackets are spaced by a wider distance than the tines.

18. The invention according to claim 10 wherein the spacing of the tines is of the order of eighteen inches.

* * * * *